United States Patent [19]
Kim

[11] 3,914,250
[45] Oct. 21, 1975

[54] 1,4-DIAZEPINO[6,5,4-JK]CARBAZOLES

[75] Inventor: Dong H. Kim, Wayne, Pa.

[73] Assignee: American Home Products Corporation, New York, N.Y.

[22] Filed: Aug. 1, 1974

[21] Appl. No.: 493,807

[52] U.S. Cl............ 260/315; 260/239 BD; 424/274
[51] Int. Cl.² ........................................ C07D 243/14
[58] Field of Search .................................... 260/315

[56] References Cited
OTHER PUBLICATIONS
Hester et al., J. Med. Chem., 13 : 827–835 (1970).

*Primary Examiner*—Sherman D. Winters
*Attorney, Agent, or Firm*—David E. Frankhouser

[57] ABSTRACT

1,2,3,4,8,9,10,11-Octahydro[1,4]diazepino[6,5,4-jk]carbazole, 1,2,3,4-tetrahydro[1,4]diazepino[6,5,4-jk]carbazole, and 1,2-dihydro[1,4]diazepino[6,5,4-jk]carbazole, and substituted derivatives thereof, have anticonvulsant activity.

12 Claims, 1 Drawing Figure

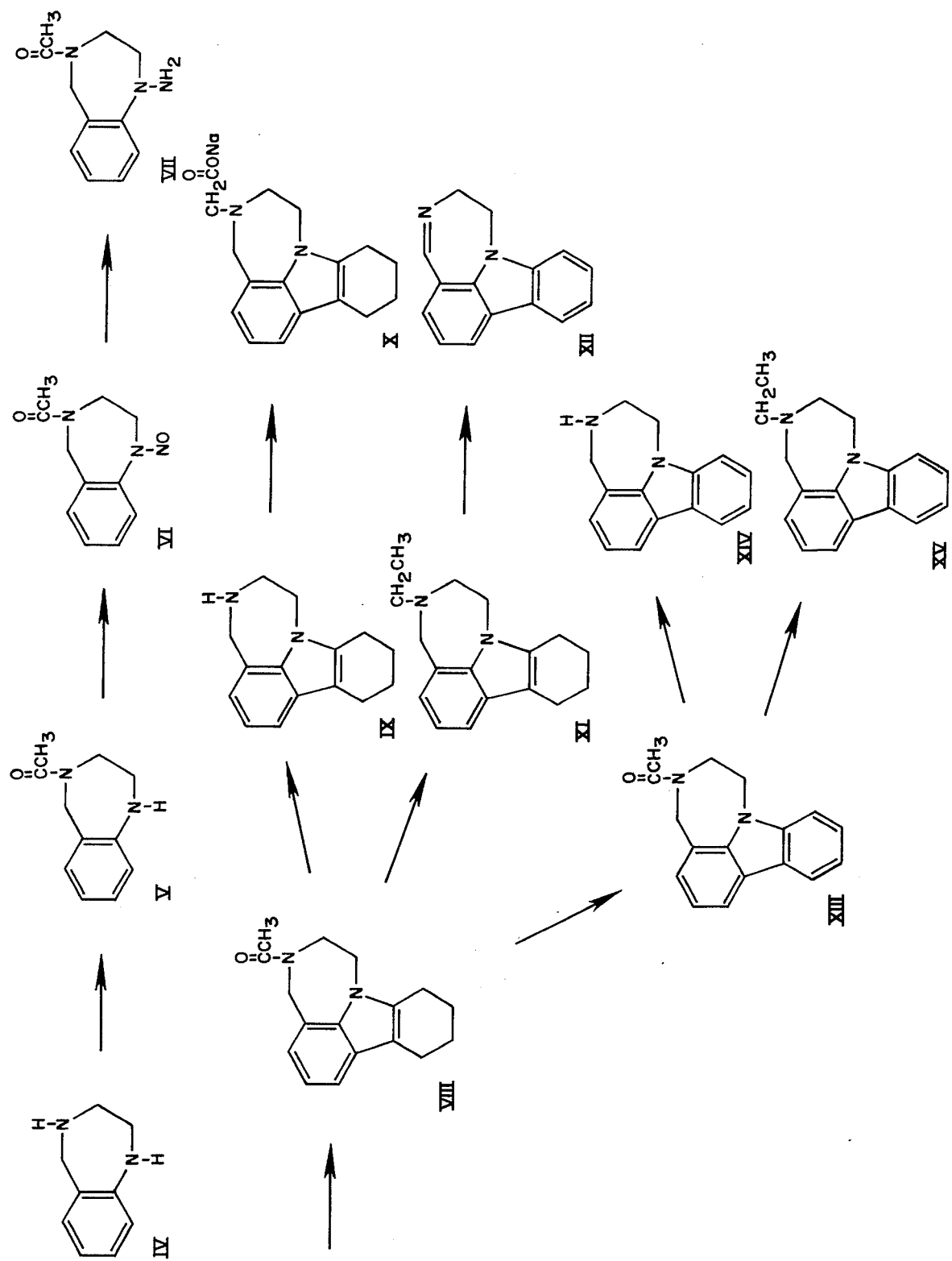

1,4-DIAZEPINO[6,5,4-JK]CARBAZOLES 4,5-Dihydropyrrolo[3,2,1-jk][1,4]benzodiazepines are described by Hester et al., *J. Med. Chem.*, 13, 827 (1970).

The invention sought to be patented comprises chemical compounds of the molecular formula:

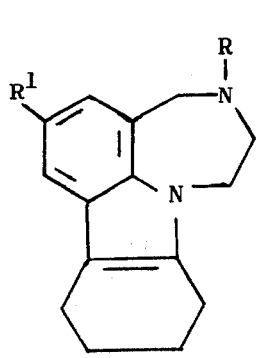

I

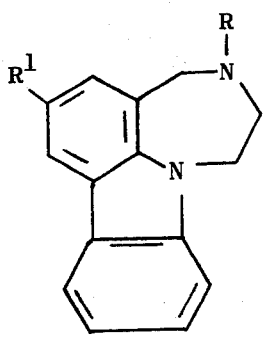

II

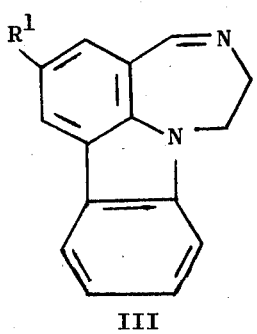

III wherein:
R is hydrogen, lower alkyl, lower alkanoyl, or sodium carboxymethyl; and
$R^1$ is hydrogen, halogen, lower alkyl, or nitro; and the nontoxic, pharmaceutically acceptable acid addition salts thereof.

The compounds of the invention possess anticonvulsant activity as demonstrated in mice by standard pharmacological test procedures.

In describing the methods of synthesizing the compounds of the invention, reference will be made to the annexed drawing which depicts schematically the reaction sequence for preparing the following compounds:

3-acetyl-1,2,3,4,8,9,10,11-octahydro-[1,4]diazepino[6,5,4-jk]carbazole (VIII)

1,2,3,4,8,9,10,11-octahydro-[1,4]-diazepino[6,5,4-jk]carbazole (IX)

1,2,3,4,8,9,10,11-octahydro-[1,4]-diazepino-[6,5,4-jk]carbazole-3-acetic acid sodium salt (X)

3-ethyl-1,2,3,4,8,9,10,11-octahydro-[1,4]diazepino[6,5,4-jk]carbazole (XI)

1,2-dihydro-[1,4]-diazepino[6,5,4-jk]carbazole (XII)

3-acetyl-1,2,3,4-tetrahydro-[1,4]-diazepino[6,5,4-jk]carbazole (XIII)

1,2,3,4-tetrahydro-[1,4]diazepino-[6,5,4-jk]carbazole (XIV)

3-ethyl-1,2,3,4-tetrahydro-[1,4]-diazepino[6,5,4-jk]carbazole (XV)

The processes depicted in the drawing and hereinafter discussed are illustrative of the general methods of preparing the compounds of Formula I, II, and III where R is hydrogen, alkyl of from 2 to 4 carbon atoms, or lower alkanoyl. When $R^1$ is a substituent other than hydrogen, the compounds can be prepared from a 2,3,4,5-tetrahydro-1H-benzodiazepine having an appropriate substituent ($R^1$) in the 7-position.

With reference to the drawing, where the compounds depicted are assigned Roman numerals for identification, in the first step, a 2,3,4,5-tetrahydro-1H-benzodiazepine (IV) is monoacylated to give a 4-alkanoyl-2,3,4,5-tetrahydro-1H-benzodiazepine (V). The acylation is conveniently carried out using a carboxylic acid anhydride in the presence of a weak base (such as triethylamine), although other commonly-used acylating agents, for example, a carboxylic acid halide, may be employed. The 4-alkanoyl tetrahydrobenzodiazepine (V) is transformed into a 3-alkanoyl-1,2,3,4,8,9,10,11-octahydro[1,4-]diazepino[6,5,4-jk]carbazole (VIII) by means of a three-step process which involves:

A. treating the 4-alkanoyltetrahydrobenzodiazepine (V) with sodium nitrite in the presence of a mineral acid, preferably hydrochloric acid, to give the N-nitroso derivate thereof;

B. reducing the N-nitroso group to an N-amino group with zinc dust in acetic acid; and C. condensing the amino compound with cyclohexanone in acetic acid.

The alkanoyl group of a 3-alkanoyl-1,2,3,4,8,9,10,11-octahydro[1,4]diazepino[6,5,4-jk]carbazole (VIII) can be removed by acid hydrolysis to give a 3-unsubstituted product (IX), or it can be reduced with lithium aluminum hydride, or like reagent, to give a compound having a corresponding alkyl group at the 3-position (XI). A compound unsubstituted at the 3-position can (IX), if desired, be treated with ethyl bromoacetate and then sodium hydroxide to give a 3-sodium carboxymethyl compound (X). A compound containing a 3-alkyl group (XI) can be aromatized with loss of the alkyl group by treatment with palladium-charcoal in refluxing xylene to give a 1,2-dihydro-[1,4]diazepino[6,5,4-jk]carbazole (XII).

Aromatization of a 3-alkanoyl-1,2,3,4,8,9,10,11-octahaydro-[1,4]diazepino[6,5,4-jk]carbazole with palladium-charcoal in refluxing xylene gives a 3-alkanoyl-1,2,3,4-tetrahydro[1,4]-diazepino[6,5,4-jk]carbazole (XIII), the 3-alkanoyl group of which can be removed by acid hydrolysis to give a 3-unsubstituted product (XIV), or it can be reduced to give the 3-alkyl product (XV).

In an alternative method a 3-alkyl-1,2,3,4,8,9,10,11-octahydro[1,4]diazepino[6,5,4-jk]carbazole can be prepared from a 4-alkyl-2,3,4,5-tetrahydro-1H-1,4-benzodiazepine by the methods hereinbefore described for the preparation of a 3-alkanoyl-1,2,3,4,8,9,10,11-octahydro[1,4]diazepino[6,5,4-jk]carbazole. If desired, the 3-alkyl-1,2,3,4,8,9,10,11-octahydro[1,4-]diazepino[6,5,4-jk]carbazole can be aromatized with palladium-charcoal with loss of the alkyl group to give a 1,2-dihydro-[1,4]diazepino[6,5,4-jk]carbazole. In yet another method a 3-alkyl-1,2,3,4,8,9,10,11-octahydro[1,4]-diazepino[6,5,4-jk]carbazole or a 3-alkyl-1,2,3,4-tetrahydro[1,4]-diazepino[6,5,4-jk]carbazole can be prepared by alkylation of a 1,2,3,4,8,9,10,11-octahydro[1,4]diazepino[6,5,4-jk]carbazole or a 1,2,-3,4-tetrahydro[1,4]diazepino[6,5,4-jk]carbazole, respectively, using conventional techniques, such as treatment with an alkyl halide. In still another method, a compound of Formula I or II where R is methyl can be prepared from a 1,2,3,4,8,9,10,11-octahydro[1,4]diazepino[6,5,4-jk]carbazole or a 1,2,-3,4-tetrahydro[1,4]diazepino[6,5,4-jk]carbazole by formylation, (for example, using phenyl formate) at the 3-position followed by reduction of the formyl group.

As used herein and in the claims the term "lower alkyl" means a straight or branched-chain saturated aliphatic hydrocarbon group having from 1 to 4 carbon atoms. "Lower alkanoyl" means a group

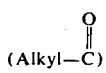

derived from a saturated organic carboxylic acid having from 2 to 4 carbon atoms, for example acetyl, propionyl, or butyroyl. "Halogen" means a chlorine, bromine, iodine, or fluorine atom.

It will be appreciated that the compounds depicted in Formula I or II can form acid addition salt with a suitablely strong acid. For the pharmacological purposes described herein, such salts must be non-toxic and pharmaceutically acceptable. Appropriate salts are those formed from either inorganic and organic acids, for example: hydrochloric, hydrobromic, sulfuric, sulfonic, phosphoric, nitric, maleic, fumaric, benzoic, ascorbic, pamoic, succinic, methonesulfonic, acetic, propionic, tartaric, citric, lactic, malic, mandelic, cinnamic, palmitic, itaconic, and benzenesulfonic. Other suitable salts will be known to those skilled in the art. The compounds of Formula III can form acid addition salts with mineral acids, for example, sulfuric, nitric, hydrochloric, hydrobromic, and like non-toxic, pharmaceutically acceptable acids.

The methods of making and using the compounds of the invention are illustrated in the following examples:

EXAMPLE I

4-Acetyl-2,3,4,5-Tetrahydro-1H-Benzodiazepine

Acetic anhydride (18 g) was added dropwise to an ether solution (450 ml) containing 2,3,4,5-tetrahydro-1H-benzodiazepine (26.4 g) and triethylamine (27 g) at room temperature. The resulting mixture was refluxed gently for 4 hr. A precipitate, which formed during the reaction, was removed by filtration, and the filtrate was concentrated under reduced pressure to about a half of the original volume. Chilling of the concentrated solution in a freezer overnight caused separation of a precipitate which was collected on a filter, and washed with ether several times, then with water 5 times giving 21.5 g of the title product, mp. 84°–86°. An analytical sample, mp. 84°–86°, was obtained by recrystalliziation from ether.

Analysis for: $C_{11}H_{14}N_2O$.
Calculated: C, 69.44; H, 7.42; N, 14.73.
Found: C, 69.60; H, 7.50; N, 14.59.

EXAMPLE II

4-Acetyl-7-Chloro-2,3,4,5-Tetrahydro-1H-1,4-Benzodiazepine

Acetic anhydride (6 g) was added dropwise to an ether solution (200 ml) containing 7-chloro-2,3,4,5-tetrahydro-1H-1,4-benzodiazepine (9.1 g), triethylamine (12 ml) and pyridine (1 ml). The resulting mixture was heated under gentle reflux for 4 hr. Organic salts formed were removed by filtration. The filtrate was evaporated under reduced pressure to give an oil. The oil was treated with dilute aqueous sodium hydroxide, and extracted with ether. The combined ether extract was washed with water several times, and dried over $K_2CO_3$. Evaporation of ether under reduced pressure afforded an oil which crystallized to give 6.7 g of the title product, mp. 95°–96°.

Analysis for: $C_{11}H_{13}ClN_2O$.
Calculated: C, 58.80; H, 5.83; N, 12.47.
Found: C, 58.66; H, 5.82; N, 12.58.

EXAMPLE III

3-Acetyl-1,2,3,4,8,9,10,11-Octahydro[1,4-]Diazepino[6,5,4-jk]Carbazole

An aqueous sodium nitrite solution obtained by dissolving 4.2 g of sodium nitrite in 10 ml of water was added dropwise with stirring to a cold aqueous solution of 4-acetyl-2,3,4,5tetrahydro-1H-benzodiazepine under chilling in ice. The solution was made by dissolving 11.6 g of 4-acetyl-2,3,4,5-tetrahydro-1H-benzodiazepine in 100 ml of water and 6 ml of concentrated hydrochloric acid. The stirring was continued for an additional 10 min. without chilling after the completion of the addition. The product deposited as an oil which was extracted with chloroform several times. The combined extract was washed with water then dried over $K_2CO_3$. Removal of chloroform under reduced pressure afforded a yellow oil. The oil was dissolved in 140 ml of glacial acetic acid. Thirty grams of zinc dust was added in small portions with stirring to the acetic acid solution. The temperature of the reaction mixture was kept under 30°, preferably between 30°–25° by chilling in ice. After the completion of the zinc dust addition, the reaction mixture was stirred at 25° for an additional hour. After the reaction, the reaction mixture was filtered under suction into a 500 ml round bottom flask which contained 7.0 g of cyclohexanone. The mixture thus obtained was heated on a steam bath for 1.5 hr. Acetic acid was removed in vacuo to give a resinous material. Treatment of the residue with water afforded a solid residue which was collected on a filter and washed with water several times. Recrystallization from ether with a small amount of tetrahydrofuran afforded 7.3 g of 3-acetyl-1,2,3,4,8,9,10,11-octahydro-[1,4]diazepino[6,5,4-jk]carbazole, mp. 129°–131°. An analytical sample which was obtained by recrystallization from ether melted at 130°–132°.

Analysis for: $C_{17}H_{20}N_2O$.
Calculated: C, 76.08; H, 7.51; N, 10.44.
Found: C, 76.24; H, 7.64; N, 10.22.

EXAMPLE IV

3-Acetyl-6-Chloro-1,2,3,4,8,9,10,11-Octahydro[1,4-]Diazepino[6,5,4-jk]Carbazole

The title compound was prepared as in Example III starting with 12 g of 4-acetyl-7-chloro-2,3,4,5-tetrahydro-1H-1,4-benzodiazepine. Amounts of all other reagents used in this preparation were the same as in Example III. The heating period of acetic acid solution in the last step was extended to 2 hr. Removal of acetic acid in vacuo afforded a resinous material which was washed with water repeatedly. The resin was allowed to sit in water for 2 days, and there was obtained a crystalline product which was collected on a filter. Recrystallization of the product from a mixture of tetrahydrofuran and ether afforded 6.4 g of the title compound, mp. 135°–137°. An alternative work-up of the oil involves dissolution of the oil in ether. Treatment of the ether solution with HCl saturated ether causes formation of a precipitate which is separated by filtration. Removal of ether from the filtrate gives the solid title product.

Analysis for: $C_{17}H_{19}ClN_2O$.
Calculated: C, 67.43; H, 6.32; N, 9.25.
Found: C, 67.26; H. 6.60; N, 9.20.

EXAMPLE V

3-Methyl-1,2,3,4,8,9,10,11-Octahydro-[1,4]Diazepino[6,5,4-jk]Carbazole

The title compound was prepared by the same procedure used for the synthesis of 3-acetyl-1,2,3,4,8,9,10,11-octahydro-[1,4]diazepino[6,5,4-jk]carbazole (See Example III). Starting with 10 g of 4-methyl-2,3,4,5-tetrahydro-1H-1,4-benzodiazepine, there was obtained 7.5 g of the product as an oil. The structure was supported by spectroscopic data (ir and nmr).

EXAMPLE VI 1,2,3,4,8,9,10,11-Octahydro-[1,4]Diazepino[6,5,4-jk]Carbazole

Seven grams of 3-acetyl-1,2,3,4,8,9,10,11-octahydro-[1,4]-diazepino[6,5,4-jk]carbazole was dissolved in 100 ml of concentrated hydrochloric acid in a 250 ml round bottom flask to give a brown colored solution. The flask, equipped with a water condenser, was heated on a steam bath for 4 hr., then an additional 2 hr. without the condenser. A precipitate separated during the last hour of heating. Chilling of the reaction mixture in ice caused separation of an additional precipitate. The precipitate was collected on a filter and washed with water to give 6.5 g of the title compound as the hydrochloride salt, mp. 318° dec. An analytical sample was obtained by recrystallization from water, mp. 326° dec.

Analysis for: $C_{15}H_{18}N_2 \cdot HCl$.
Calculated: C, 68.55; H, 7.29; N, 10.66.
Found: C, 68.59; H, 7.14; N, 10.49.

Two grams of the hydrochloride salt was treated with about 70 ml of dilute aqueous sodium hydroxide solution. The mixture was extracted with ether several times. The combined ether extract was dried over $K_2CO_3$, and evaporated under reduced pressure to give 1.3 g of 1,2,3,4,8,9,10,11-octahydro[1,4-]diazepino[6,5,4-jk]carbazole, mp. 109°–111°. Recrystallization from ether plus petroleum ether improved the mp. to 113°–115°.

Analysis for: $C_{15}H_{18}N_2$.
Calculated: C, 79.60; H, 8.02; N, 12.38.
Found: C, 79.60; H, 8.09; N, 12.34.

EXAMPLE VII

3-Acetyl-1,2,3,4-Tetrahydro-[1,4]Diazepino[6,5,4-jk]Carbazole

A mixture of 3-acetyl-1,2,3,4,8,9,10,11-octahydro-[1,4]-diazepino[6,5,4-jk]carbazole (6.0 g), palladium-charcoal (10%) (5.0 g), and xylene (400 ml) was refluxed under nitrogen for 24 hr., then filtered while hot using a sintered glass filter. Removal of xylene in vacuo gave an oily residue. Treatment of the oil with a small amount of tetrahydrofuran afforded 4.05 g of the title product, mp. 113°–115°.

Analysis for: $C_{17}H_{16}N_2O$.
Calculated: C, 77.25; H, 6.10; N, 10.60.
Found: C, 76.97; H, 6.20; N, 10.48.

EXAMPLE VIII 1,2,3,4-Tetrahydro-[1,4]Diazepino[6,5,4-jk]Carbazole

A mixture of 3-acetyl-1,2,3,4-tetrahydro-[1,4]diazepino-[6,5,4-jk]carbazole (0.6 g) and 20% sulfuric acid (40 ml) was heated under reflux for 4 hr. Chilling of the reaction mixture in ice caused separation of a precipitate which was collected on a filter. Recrystallizations from water afforded 1,2,3,4-tetrahydro-[1,4]diazepino[6,5,4-jk]carbazole, hemisulfate, hemihydrate, mp. 258°–260° dec.

Analysis for: $C_{15}H_{14}N_2 \cdot 1/2H_2SO_4 \cdot 1/2H_2O$.
Calculated: C, 64.27; H, 5.75; N, 10.00.
Found: C, 64.19; H, 5.44; N, 9.68.

The sulfuric acid salt was dissolved in water. The aqueous solution was made alkaline with an addition of dilute aqueous sodium hydroxide, and extracted with ether several times. The ether extract was dried over $K_2CO_3$. Addition of ether-HCl solution to the ether extract caused separation of a precipitate which was collected on a filter and recrystallized from ethanol with charcoal treatment to give the title product as the hydrochloride salt, mp. 286°–288° dec.

Analysis for: $C_{15}H_{14}N_2 \cdot HCl$.
Calculated: C, 69.62; H, 5.84; N, 10.83.
Found: C, 69.29; H, 5.87; N, 10.69.

EXAMPLE IX

3-Ethyl-1,2,3,4,8,9,10,11-Octahydro[1,4-]Diazepino[6,5,4-jk]Carbazole

3-Acetyl-1,2,3,4,8,9,10,11-octahydro-[1,4]diazepino[6,5,4-jk]carbazole (8.1 g) was reduced with lithium aluminum hydride (2.3 g) using tetrahydrofuran as a solvent, by a conventional method, giving the product (6.5 g) as an oil. A small portion of the oily product was dissolved in anhydrous ether. Addition of ether-HCl solution to this ether solution caused separation of a precipitate which was collected on a filter and dried over $P_2O_5$ in vacuo. It was then recrystallized from isopropanol with charcoal treatment to give the title product as the hydrochloride salt, mp. 149°–151°.

Analysis for: $C_{17}H_{22}N_2 \cdot HCl$.
Calculated: C, 70.20; H, 7.98; N, 9.64.
Found: C, 70.59; H, 8.04; N, 9.63.

EXAMPLE X

3-Ethyl-1,2,3,4-Tetrahydro-[1,4]Diazepino[6,5,4-jk]Carbazole

Three grams of 3-acetyl-1,2,3,4-tetrahydro-[1,4]diazepino[6,5,4-jk]carbazole was reduced with 0.86 g of lithium aluminum hydride by a conventional method using tetrahydrofuran as a solvent, giving an oil. The oil was converted into a hydrochloride salt by treatment in ether with dry HCl gas. The material thus obtained was recrystallized from absolute ethanol giving 2.0 g of the title compound as the hydrochloride salt, mp. 237°–239°.

Analysis for: $C_{17}H_{18}N_2 \cdot HCl$.
Calculated: C, 71.19; H, 6.68; N, 9.77.
Found: C, 70.38; H, 6.87; N, 9.31.

EXAMPLE XI

6-Chloro-3-Ethyl-1,2,3,4,8,9,10,11-Octahydro-[1,4]Diazepino[6,5,4-jk]Carbazole

Three grams of 3-acetyl-6-chloro-1,2,3,4,8,9,10,11-octahydro[1,4]diazepino[6,5,4-jk]carbazole was reduced with 0.8 g of lithium aluminum hydride using tetrahydrofuran as a reaction medium by a conventional method, giving 4 g of 6-chloro-3-ethyl-1,2,3,4,8,9,10,11-octahydro-[1,4]diazepino[6,5,4-jk]carbazole in an oily form. The oil was dissolved in anhydrous ether and treated with ether-HCl solution. The material thus separated was collected on a filter under nitrogen atmosphere and dried over $P_2O_5$ in vacuo. The title product as the hydrochloride salt melted at 229°–231° and amounted to 5.2 g.

Analysis for: $C_{17}H_{21}N_2Cl \cdot HCl$.
Calculated: C, 62.77; H, 6.82; N, 8.61; Cl, 21.80.
Found: C, 62.88; H, 6.92; N, 8.48; Cl, 21.85.

EXAMPLE XII 1,2,3,4,8,9,10,11-Octahydro[1,4]Diazepino-[6,5,4-jk]Carbazole-3-Acetic Acid Sodium Salt A mixture of 1,2,3,4,8,9,10,11-octahydro-[1,4]diazepino-[6,5,4-jk]carbazole (2.5 g), ethyl bromoacetate (1.9 g), sodium bicarbonate (0.95 g) and dimethylformamide (50 ml) was heated under reflux for 3.5 hr. The dimethylformamide was removed in vacuo. The residue was treated with ether and water. The ether layer was washed with water 3 times, then dried over $K_2CO_3$. Removal of ether under reduced pressure afforded an oil. Twenty-five ml of 15% aqueous sodium hydroxide solution was added to the residue, and heated under reflux for 1.5 hr. In ca 40 min. a precipitate started to separate. This was collected on a filter and recrystallized from water with charcoal treatment to give the title product, which did not melt below 360°.

Analysis for: $C_{17}H_{19}N_2O_2Na$.
Calculated: C, 66.64; H, 6.25; N, 9.15.
Found: C, 66.85; H, 6.54; N, 9.34.

EXAMPLE XIII 1,2-Dihydro-[1,4]Diazepino[6,5,4-jk]Carbazole

A mixture of 3-ethyl-1,2,3,4,8,9,10,11-octahydro-[1,4]-diazepino[6,5,4-jk]carbazole (2.5 g), palladium-charcoal (10%) (2.5 g) and xylene (250 ml) was refluxed under nitrogen atmosphere for 30 hr. The catalyst was removed by filtration while hot, and washed with hot xylene several times. Removal of xylene in vacuo on a rotary evaporator afforded an oil. The oil was dissolved in warm ether, treated with charcoal and filtered. Chilling of the filtrate in dry ice-acetone mixture caused separation of a precipitate of the title product which was collected on a filter, mp. 114°–116°.

Analysis for: $C_{15}H_{12}N_2$.
Calculated: C, 81.79; H, 5.49; N, 12.72.
Found: C, 81.41; H, 5.73; N, 12.40.

EXAMPLE XIV

The anticonvulsant activity of the compounds of Formula I, II, and III, hereinbefore described, can be demonstrated and ellicited by the following standard test procedure:

The compound is administered orally or intraperitoneally in graded doses to groups of three mice. About 2 to 3 hours later the animals are given a supramiximal electroshock through corneal electrodes (25 mA, 0.2 rec.). Active compounds will protect the compounds against tonic extensor seizures.

When tested as above-described the following compounds provided protection against seizures at the doses indicated:

| Compound | Dose |
|---|---|
| 3-Acetyl-1,1,2,3,4,8,9,10,11-octahydro-[1,4]diazepino[6,5,4-jk]carbazole | 127 mg/kg (P.O.) |
| 3-Acetyl-6-chloro-1,2,3,4,8,9,10,11-octahydro[1,4]-diazepino[6,5,4-jk]carbazole | 400 mg/kg (I.P.) |
| 1,2,3,4,8,9,10,11-Octahydro-[1,4]diazepino[6,5,4-jk]carbazole | 40 mg/kg (P.O.) |
| 3-Acetyl-1,2,3,4-tetrahydro-[1,4]diazepino[6,5,4-jk]-carbazole | 127;400 mg/kg (P.O.) |
| 1,2,3,4-Tetrahydro-[1,4]-diazepino[6,5,4-jk]carbazole | 127 mg/kg (P.O.) |
| 3-Ethyl-1,2,3,4,8,9,10,11-octahydro-[1,4]diazepino-[6,5,4-jk]carbazole | 127 mg/kg (P.O.) |
| 3-Ethyl-1,2,3,4-tetrahydro-[1,4]diazepino[6,5,4-jk]-carbazole | 400 mg/kg (P.O.) |
| 6-Chloro-3-ethyl-1,2,3,4,8,9,10,11-octahydro-[1,4]diazepino-[6,5,4-jk]carbazole | 127 mg/kg (I.P.)  400 mg/kg (P.O.) |
| 1,2,3,4,8,9,10,11-Octahydro[1,4]diazepino[6,5,4-jk]carbazole-3-acetic acid sodium salt | 127 mg/kg (P.O.) |
| 1,2-Dihydro-[1,4]diazepino-[6,5,4-jk]carbazole | 400 mg/kg (P.O.) |

The above-described test may be performed using groups of six mice with the electroshock being given 1 hour after administration of the compound. An $ED_{50}$ against extensor seizures is calculated. When tested in such manner, the following compounds provided protection at the indicated $ED_{50}$ dose:

| Compound | $ED_{50}$ (mg/kg) |
|---|---|
| 3-Acetyl-1,2,3,4,8,9,10,11-octahydro-[1,4]diazepino-[6,5,4-jk]carbazole | 112 |
| 1,2,3,4,8,9,10,11-Octahydro-[1,4]diazepino[6,5,4-jk]-carbazole | 23.5 |
| 3-Ethyl-1,2,3,4-tetrahydro-[1,4]diazepino[6,5,4-jk]-carbazole | 92 |
| 6-Chloro-3-ethyl-1,2,3,4,8,9,10,11-octahydro-[1,4]diazepino-[6,5,4-jk]carbazole | 205 |

In addition to the ability to protect against seizures induced by electroshock, certain compounds have shown the ability to protect against seizures induced by metrazol. In this test, the compound is administered orally in graded doses to groups of six mice. One hour later the animals are challenged with metrazol (125 mg/kg, I.P.). The incidence of cloric and tonic convulsions and deaths is observed for one half hour. Protection against convusions and deaths is determined by comparison with controls run simultaneously. An $ED_{50}$ against convulsions and/or deaths is calculated from probit-log dose caves. When tested as above described, the following compounds showed anticonvulsant activity as evidenced by protection against tonic convulsions at the doses ($ED_{50}$) set forth below:

| | ED$_{50}$ (mg/kg) |
|---|---|
| 3-Acetyl-1,2,3,4,8,9,10,11-octahydro-[1,4]diazepino-[6,5,4-jk]carbazole | 19* |
| 3-Acetyl-6-chloro-1,2,3,4,8,9,10,11-octahydro[1,4]diazepino-[6,5,4-jk]carbazole | 230* |
| 1,2,3,4,8,9,10,11-Octahydro-[1,4]diazepino[6,5,4-jk]carbazole | 14* |
| 3-Ethyl-1,2,3,4-tetrahydro-[1,4]diazepino[6,5,4-jk]-carbazole | 72* |

*Protection against tonic convulsions

What is claimed is:
1. A compund of the formulae:

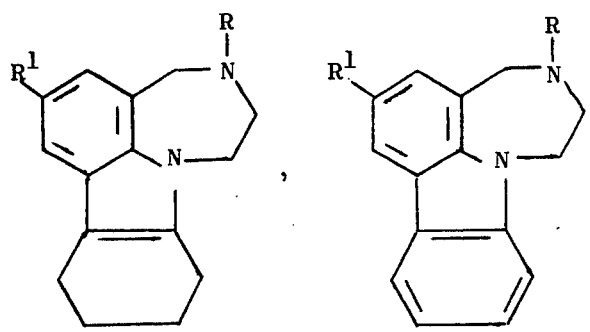

and

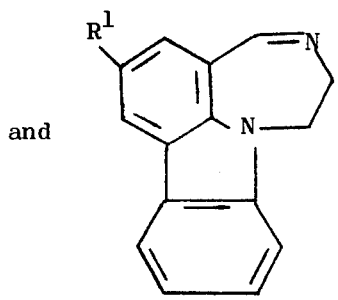

wherein:
R is hydrogen, lower alkyl, lower alkanoyl, or sodium carboxymethyl; and
R$^1$ is hydrogen, halogen, lower alkyl, or nitro; or a nontoxic, pharmaceutically acceptable acid addition salt thereof.

2. The compound as defined in claim 1 which is 3-acetyl-1,2,3,4,8,9,10,11-octahydro-[1,4]diazepino[6,5,4-jk]carbazole.

3. The compound as defined in claim 1 which is 3-acetyl-6-chloro-1,2,3,4,8,9,10,11-octahydro-[1,4]diazepino[6,5,4-jk]carbazole.

4. The compound as defined in claim 1 which is 1,2,3,4,8,9,10,11-octahydro-[1,4]diazepino[6,5,4-jk]carbazole.

5. The compound as defined in claim 1 which is 3-acetyl-1,2,3,4-tetrahydro-[1,4]diazepino[6,5,4-jk]carbazole.

6. The compound as defined in claim 1 which is 1,2,3,4-tetrahydro-[1,4]diazepino[6,5,4-jk]carbazole.

7. The compound as defined in claim 1 which is 3-ethyl-1,2,3,4,8,9,10,11-octahydro-[1,4]diazepino[6,5,4-jk]carbazole.

8. The compound as defined in claim 1 which is 3-ethyl-1,2,3,4-tetrahydro-[1,4]diazepino[6,5,4-jk]carbazole.

9. The compound as defined in claim 1 which is 6-chloro-3-ethyl-1,2,3,4,8,9,10,11-octahydro-[1,4]diazepino[6,5,4-jk]carbazole.

10. The compound as defined in claim 1 which is 3-methyl-1,2,3,4,8,9,10,11-octahydro-[1,4]diazepino[6,5,4-jk]carbazole.

11. The compound as defined in claim 1 which is 1,2,3,4,8,9,10,11-octahydro[1,4]diazepino[6,5,4-jk]carbazole-3-acetic acid sodium salt.

12. The compound as defined in claim 1 which is 1,2-dihydro-[1,4]diazepino[6,5,4-jk]carbazole.

* * * * *